United States Patent [19]

Vaccaro et al.

[11] Patent Number: 4,536,410
[45] Date of Patent: Aug. 20, 1985

[54] DIPEPTIDE SWEETENER COMPOSITION

[75] Inventors: Nancy J. Vaccaro, Putnam Valley; John R. Frost, Beacon, both of N.Y.; Alfred C. Glatz, Stamford, Conn.; Timothy W. Schenz, Haworth, N.J.

[73] Assignee: General Foods Corporation, White Plains, N.Y.

[21] Appl. No.: 531,525

[22] Filed: Sep. 12, 1983

[51] Int. Cl.$^3$ ............................................. A23L 1/22
[52] U.S. Cl. ..................................... 426/548; 426/3; 426/573; 426/613
[58] Field of Search ................... 426/548, 573, 613

[56] References Cited

U.S. PATENT DOCUMENTS

| | | | |
|---|---|---|---|
| 3,360,376 | 12/1967 | Dobson | 426/573 |
| 3,397,997 | 8/1968 | Japikse | 426/573 |
| 3,425,842 | 2/1969 | Japikse | 426/573 X |
| 3,475,403 | 10/1969 | Mazur et al. | 426/548 X |
| 3,642,491 | 2/1972 | Schlatter | 426/548 |
| 3,714,139 | 1/1973 | Schlatter | 426/548 |
| 4,382,924 | 5/1983 | Berling et al. | 426/548 X |
| 4,465,694 | 8/1984 | Okada | 426/3 |

OTHER PUBLICATIONS

"Equa 200 ™ (Aspartame) Sweetener As a Food Ingredient", Sep. 27, 1974, Searle Biochemics: Arlington Heights, Illinois, p. 2.

Primary Examiner—Joseph Golian
Attorney, Agent, or Firm—Joseph T. Harcarik; Thomas R. Savoie; Daniel J. Donovan

[57] ABSTRACT

A composition which stabilizes a dipeptide sweetener, modifies the physical characteristics of a lipid, or both is disclosed. This composition comprises a hydrated, crystalline dipeptide sweetener and a lipid.

31 Claims, 2 Drawing Figures

DIPEPTIDE SWEETENER COMPOSITION

FIELD OF THE INVENTION

The present invention relates to a dipeptide sweetener composition. More particularly the present invention is concerned with a dipeptide sweetener composition in which dipeptide sweeteners are combined with lipids so as to form a gel which is thermally irreversible.

DESCRIPTION OF THE PRIOR ART

Dipeptide sweeteners such as α-L-aspartyl-L-phenylalanine-methyl ester (aspartame or APM) disclosed by Schlatter in U.S. Pat. No. 3,492,131; the L-aspartyl-D-alaninamides and L-aspartyl-D-serinamided disclosed in U.S. Pat. No. 4,373,430; and L-α-aspartyl-L-tyrosine disclosed in U.S. Pat. No. 4,017,422 are generally known as low-calorie sweetening agents which have the quality of possessing a clear initial taste without an unpleasant bitter aftertaste. Nonetheless, heat and enzymes readily degrade aspartame in an aqueous environment causing aspartame to be far less stable than other well-known sweeteners such as sugars, polyols and synthetic chemical sweeteners such as cyclamate and saccharin. Because of this instability, food processors need a means of preserving dipeptide sweeteners throughout standard food processing procedures.

Unlike dipeptide sweeteners, lipids, even in an aqueous environment, can withstand considerable heat. Nonetheless, the physical structure of a lipid—its double bonds, the location of its double bonds, and the stereochemistry of its double bonds—normally determines the lipids other properties. However, food processors typically desire a mix of properties not available with any one particular lipid, for example, a flaky pie crust requires a hard fat, but nutritionally, polyunsaturated oils are preferred. Consequently, food processors desire a method for modifying lipid properties.

SUMMARY OF THE INVENTION

Accordingly, one object of the present invention is to provide a low-calorie dipeptide sweetener composition with improved stability.

Another object of the present invention is to provide a means for modifying the physical attributes of a lipid.

It is yet another object of the present invention to provide a dipeptide sweetener composition in which the dipeptide is stabilized but nonetheless has no discernible effect on the sweetness quality of the dipeptide sweetener.

Briefly, these and other objects of the present invention, as will hereinafter be more readily apparent, can be obtained by a dipeptide sweetener composition which comprises a hydrated dipeptide sweetener and a lipid.

DETAILED DESCRIPTION OF THE INVENTION

Figure 1:
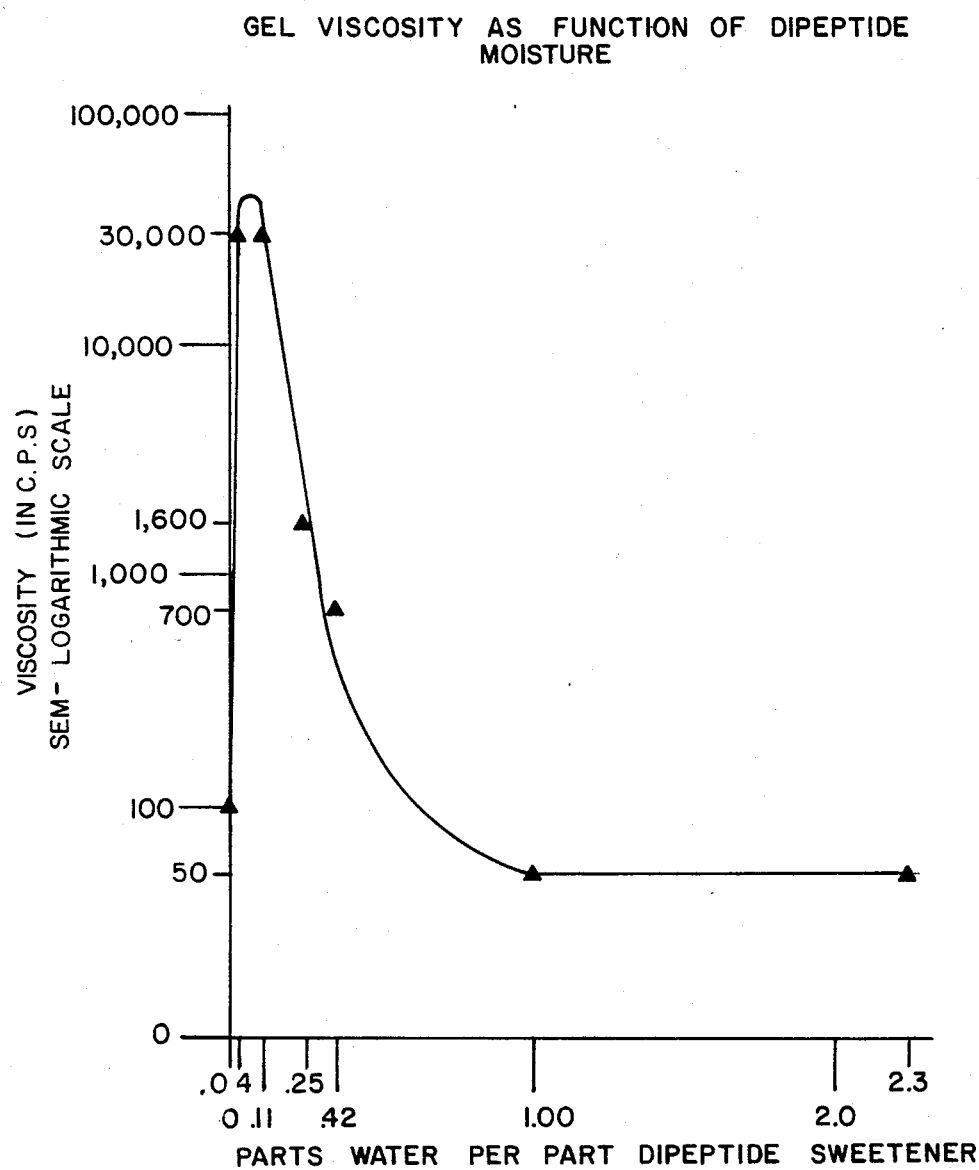
FIG. 1 shows the functional relationship between the percent moisture in the aspartame and the gel viscosity.

While aspartame is the preferred dipeptide sweetener of the present invention, aspartame is only functional in the present invention when it is hydrated with between about 0.02 and about 1 part water per each part aspartame. However, it is preferred that the aspartame be hydrated with between about 0.02 and about 0.5 parts water for each part aspartame. It is further preferred that the aspartame contain between about 0.02 and about 0.3 parts water per part aspartame. Moreover, it is essential that the aspartame be substantially in a crystalline form and that at least some of the water is water of crystallization, and preferredly some water is absorbed on the surface of the aspartame.

While any lipid may be useful in the present invention, it is preferred that the lipid component be selected from the group composed of hydrocarbons, aliphatic alcohols, aliphatic acids, esters of aliphatic acids, glycerol containing lipids and combinations thereof. It is more preferred that the lipid component of the present invention be selected from the group composed of aliphatic acids, esters of aliphatic acids, glycerol containing lipids and combinations thereof. Aliphatic fatty acids esters are more preferred and the aliphatic fatty acid esters of glycerol are the most preferred lipids of the present invention. Examples of aliphatic fatty acid triesters useful in the present invention comprise tallow, lard, cocoa butter, palm oil, palm kernel oil, coconut oil, cotton seed oil, peanut oil, rape seed oil, corn oil, safflower oil, sunflower oil, soy bean oil and combinations thereof. Glycerol diesters, propylene glycol diesters, and combinations thereof are examples of aliphatic fatty acid diesters useful in the present invention. Fatty acid monoesters useful in this invention comprise: monoglycerides, propylene glycol and monostearate and combinations thereof. Moreover, it is preferred that the fatty acid residues of the esters consist essentially of saturated, unsaturated, and polyunsaturated aliphatic acids containing between about 10 and about 30 carbon atoms, and combinations thereof.

The hydrated dipeptide sweetener is combined with at least about 1 but less than about 100 parts of lipid for each part of the dipeptide sweetener. However, it is preferred that at least about 3; more preferably at least about 5; and most preferably at least about 10 parts of lipid are combined with each part dipeptide sweetener. Furthermore, it is preferred that less then about 30 parts and more preferably, less than about 20 parts of lipid are combined with each part dipeptide sweetener. Typically, this admixture is heated to a temperature above about 25° C., preferably to a temperature above about 50° C. Additionally, the dipeptide sweetener-lipid admixture is agitated so as to thoroughly blend the components. Nonetheless, it is preferred that the admixture is kept at or below the temperature at which the lipid used decomposes, a temperature commonly known as the lipid's smoke point. It is further preferred that the admixture temperature be kept at least 10° C. below this lipid decomposition temperature or smoke point. It is also preferred that the lipid temperature, at the time the aspartame is combined with the lipid, is less than the temperature at which aspartame, if heated alone, would decompose. Thus it is preferred that the lipid temperature at the time the lipid component and the aspartame are combined is less than about 195° C., and more preferably this temperature is less than about 175° C. However, once the aspartame lipid gel has started to form, the admixture may be heated to the lipids decomposition temperature even if this temperature exceeds the aspartame decomposition temperature without destroying the gel.

While it is possible to incorporate additional ingredients or materials into the dipeptide sweetener-lipid admixture before the gel's formation, some additional ingredients will, at some concentrations, inhibit or prevent the gel's formation, e.g. large amounts of water. Thus it is also preferred that the dipeptide sweetener-lipid combination contain other materials at a level less than the level at which the other materials are effective to inhibit the gel's formation.

The heating step in the process of the instant invention may be accomplished by any conventional heating means including: conduction, convection, radiation, microwave, and combinations thereof.

The time and temperature of heating necessary to produce the thermally irreversible thixotropic gel of the present invention are inversely related. Thus, the higher the temperature to which the admixture is heated, the shorter the necessary heating period. However, the admixture should be heated for about at least 10 seconds and preferably at least about 30 seconds, and most preferably, the admixture is heated for at least about 5 minutes. Nonetheless, the dipeptide sweetener-lipid admixture is preferably heated for less than about 72 hours.

As a result of this heating, unlike most fluids, the viscosity of the admixture increases. Minimumly, the admixture should be heated at a temperature and for a time effective to produce at least about a 100% (1.0 fold) increase in the viscosity. This increase in the viscosity is determined by measuring the viscosity of the admixture; subtracting the viscosity of the lipid with the dipeptide sweetener added at the instant the dipeptide sweetener was added to the lipid from the viscosity of the admixture; and dividing this quantity by the viscosity of the lipid with the dipeptide sweetener added at the instant the dipeptide sweetener was added to the lipid. All of these viscosity measurements are made at the same temperature, which temperature is above the lipid component's melting point or range. Restated, the increase in viscosity is determined by the following formula:

$$\Delta\eta = (\eta_A - \eta_L)/\eta_L$$

wherein, $\Delta\eta$ is the increase in viscosity;

$\eta_A$ is the viscosity of the admixture; and $\eta_L$ is the viscosity of the lipid and dipeptide sweetener combination at the point in time at which the dipeptide sweetener is added to the lipid. Thus, $\eta_L$ compensates for the increase in viscosity due to the presence of an additive dispersed in the lipid.

In most cases $\eta_L$ will be approximately equal to the viscosity of the oil alone.

However, it is preferred that the heating be for a time and at a temperature effective to produce a viscosity increase about at least about 1,000% (10) and more preferably at least about 10,000% (100). Nonetheless, the viscosity increase is preferably less than about $10^7$ fold.

While viscosity may be measured in a number of ways, the Brookfield HAT Viscometer is an especially preferred instrument for measuring the viscosity of the gel of the instant invention. In measuring the viscosity of the gel of the instant invention with a Brookfield HAT Viscometer, a configuration of said instrument comprising a helipath stand and either a cylindrical or a T-bar spindle is further preferred. Typical use of this instrument will require placing about 200 ml of the material whose viscosity is to be measured in a 250 ml beaker. Next, an appropriate spindle and rotation speed (rpm) is chosen for the Viscometer to obtain a reading within the range of the instrument's indicator. Then, using for example the helipath stand and a T-bar spindle, the instrument is turned on and the spinning spindle is allowed to penetrate the sample. While the spinning spindle is in the sample, a dial or indicator reading is made. The dial reading is converted to a centipoise viscosity measurement by multiplying the dial reading by a factor that is appropriate for the spindle and the speed of rotation used. Thus, the "F" T-bar rotating at 0.5 rpm dial reading is multiplied by $4 \times 10^5$, and the #2 cylindrical spindle rotating at 50 rpm dial reading is multiplied by 16.

EXAMPLE 1-7

Wesson TM Oil, 90 gm was combined with 10 gm of aspartame. The moisture of the aspartame was varied from 0 to 2.3 parts water per part aspartame among these examples. The oil-aspartame admixture was heated to 100° C. for 30 minutes with mixing. At 43° C., the Example 1 admixture had a viscosity ($\eta_L$) of 100 centipoise (cps). This value was used to calculate $\Delta\eta$ in Example 2-14 as well. After the heating and mixing step, the examples had the following viscosities ($\eta_A$) and viscosity increases ($\Delta\eta$), also at 43° C.:

| Example | Parts Water Per Part Aspartame | $\eta_A$ (in cps) | $\Delta\eta$ (in cps) |
|---|---|---|---|
| 1 | 0 | 100 | 0 |
| 2 | 0.04 | 30,000 | 299 |
| 3 | 0.11 | 30,000 | 299 |
| 4 | 0.25 | 1,600 | 15 |
| 5 | 0.42 | 700 | 6 |
| 6 | 1.00 | 50 | −0.5 |
| 7 | 2.3 | 50 | −0.5 |

The negative $\Delta\eta$ observed in Examples 6 and 7 is partially due to a dilution effect as a result of adding the relatively large amounts of water, 5 to 7 ml respectively, to the oil-aspartame system in these examples.

The admixture viscosities, after heating, are plotted in FIG. 1 is a function of the aspartame percent moisture.

EXAMPLES 8-14

Examples 1-7 were repeated with Hydrol 92 TM oil, a partially hydrogenated coconut oil. After the heating and mixing step, these samples had the following viscosities ($\eta_A$) and viscosity increases ($\Delta\eta$), also at 43° C.:

| Example | Parts Water Per Part Aspartame | $\eta_A$ (in cps) | $\Delta\eta$ (in cps) |
|---|---|---|---|
| 8 | 0 | 336 | 2.3 |
| 9 | 0.04 | 140,000 | 1399 |
| 10 | 0.11 | 200,000 | 1999 |
| 11 | 0.25 | 12,000 | 119 |
| 12 | 0.42 | 900 | 8 |
| 13 | 1.00 | 320 | 2.2 |
| 14 | 2.3 | 40 | −0.6 |

The results of Example 8-14 were very similar to the results for Example 1-7.

EXAMPLE 15

Cocoa butter, 100 gm, was heated to 36° C. so as to melt the fat. Aspartame, 5 gm, with a 4% moisture, was added to the melted cocoa butter and the admixture was blended. The admixture was allowed to cool to ambient temperature, and said cooling hardened the admixture. Thereafter, the admixture was heated to and maintained at 100° C. for 30 minutes. The admixture was then cooled again and combined with 100 gm of chocolate liquor. The admixture was thoroughly blended and formed a sweet, good-tasting, chocolate spread that does not melt at 37° C. (body—hand—temperature). However, shear, such as that of chewing, breaks the chocolate spread gel down to produce a desirable melted chocolate mouthfeel.

At 36° C., cocoa butter has a viscosity of 74 cps and after the admixture had been heated to 100° C. for 30 minutes, the mixture had a viscosity of $10^5$ cps. When the gel was cooled to 38° C. it had a viscosity of $2.5 \times 10^6$ cps. As a comparison, a Hershey ® Bar at 38° C. has a viscosity of $6.4 \times 10^4$ cps.

EXAMPLE 16

Wesson TM oil, 55 gm, was heated to 100° C. and then combined with 5 g aspartame. The aspartame had a 4% moisture. The admixture was kept at 100° C. for 20 minutes. Thereafter, 30 gm of cocoa powder and 125 gm of powder sugar were added to the admixture. The combination was then cooled to 55° C. and mixed well in a Waring ® blender. The product was then formed into bars to make a chocolate-like product without cocoa butter.

EXAMPLE 17

The following ingredients were dry blended to form a reduced-calorie cake mix:

| | |
|---|---|
| Swan's Down ® Cake Flour | 121.0 |
| Cellulose Flour | 50.5 |
| Egg White Solids | 10.0 |
| Non-Fat Milk Solids | 5.0 |
| Baking Soda/Baking Powder | 6.0 |
| Emulsifier | 3.0 |
| Gum | 2.0 |
| Salt, Vitamins, and Flavors | 1.5 |

Separately, 20 gm vegetable shortening was heated to 100° C. to melt. To this melted shortening, 4 gm aspartame having 4% moisture were added. Thereafter, the admixture was blended for 3 minutes in a home blender at high speed. The blended admixture was again heated to 100° C., this time for 5 minutes. Next, the shortening-aspartame gel was cooled to ambient temperature.

The above cake mix and the gel at ambient temperature were mixed vigorously for 5 minutes with a wire wisk. Once this mixing is completed, 273 gm water were added to the cake mix-gel admixture and mixed at high speed with an electric mixer for 3 minutes. The entire batter was then transferred into a greased, 8 inch (0.2 m) round cake pan and baked for 35 minutes in a preheated, 176° C. oven. After baking, the cake was cooled, and tasted. The tasters who evaluated the cake stated that it was sweet and good tasting and was sweeter tasting than a cake made from the same ingredients without first forming the gel.

EXAMPLE 18

A sufficient quantity of Soya hard fat flakes (a partially hydrogenated soybean oil) were melted to obtain an excess of the melted fat flakes. A 160. gm aliquot of the melted fat was weighed out. Separately, a sufficient quantity of sorbitan fatty acid ester was also melted. An 80. gm aliquot of the melted sorbitan ester was combined with the melted, measured fat and the combination was mixed. The combined fat and sorbitan ester was kept at a temperature just sufficient to maintain the melted state of the combination. Without cooling, the combined fat and sorbitan ester, 80. gm of a waxy corn starch was added and mixed into the melt. Thereafter, 80. gm of aspartame were added to the melted fat-sorbitan ester-starch combination and the mixture was blended. As the aspartame was being blended into the combination, a powder was formed.

This powder was sweet, hard and free-flowing. A 2400 gm force was required to deform the Example 18 sample 1 mm. Contrastingly, a 47 gm force deformed the Example 2 sample 1 mm.

EXAMPLE 19

Wesson TM oil, 80 gm were heated to 100° C. and combined with 20 gm aspartame containing 4% moisture. The combination was well mixed and kept at 100° C. for 30 minutes. Upon cooling to ambient temperature, a hard, sweet gel resulted.

An oven was preheated to 260° C. and the gel placed inside the oven for 10 minutes. When removed after the 10 minutes, the gel had changed color and was brownish. Additionally, the gel was smoking and had a off-smelling character to it. However, when cooled to ambient temperature, the gel was still very sweet tasting.

The gel was placed in the oven for an additional 10 minutes, after which the gel was substantially as it had been after the first 10 minutes in the oven. However, after the gel had been returned to the oven for a third 10 minute period, the gel was only moderately sweet, and after a fourth 10 minute period in the oven, the gel was not sweet.

EXAMPLES 20 & 21

Partially hydrogenated coconut oil, 25 gm, were heated to 100° C. and combined with 3.5 gm aspartame containing 4% moisture. The combination was well blended and kept at 100° C. for 30 minutes. This combination was then cooled to ambient temperature to produce the gel in Example 20. This gel, 5.7 gm were then combined with the following ingredients to produce a model beverage system Example 20. In Example 21, 5 gm of the partially hydrogenated oil and 0.7 gm of the aspartame containing 4% moisture were separately added to the other model beverage system ingredients.

| Ingredient | Amount (in gm) |
|---|---|
| Water | 971.0 |
| Citrate-phosphate buffer effective to produce a pH of 3.0 | >.1 |
| Sodium benzoate | 1.0 |
| Gum | 15.0 |
| Colorant | 0.1 |

Examples 20 and 21 were stored at 43° C. and aliquots of each were removed and analyzed for the amount of aspartame remaining, as a percent of the aspartame originally in each example, at each of the times indicated below.

aliquots of the combinations were cooled to ambient temperatures and their sweetness was evaluated.

GEL VISCOSITY AS A FUNCTION OF BOTH LIPID AND TIME

| Example | Lipid Composition | Lipid $\eta$ | $\eta_L$ (Lipid & APM) time = "0" | $\eta_A$ (Lipid & APM) time = 0.5 hour | $\eta_A$ (Lipid & APM) time = 1 hour | $\eta_A$ (Lipid & APM) time = 2 hrs. |
|---|---|---|---|---|---|---|
| 22 | Wesson Oil TM (mainly triglycerides) | 100 | 136 | 30,000 | 35,000 | 75,000 |
| 23 | Durlo TM (a mixture of mono, di and triglycerides) | 100 | 22,000 | 400,000 | 450,000 | 500,000 |
| 24 | Atmos TM (a mixture of mono and diglycerides) | 100 | 14,000 | 180,000 | 210,000 | 225,000 |
| 25 | Myverol TM (mainly monoglycerides) | 100 | 80,000 | 350,000 | 350,000 | 400,000 |

| Example | Lipid Composition | $\eta_A$ (Lipid & APM) time = 4 hrs. | $\eta_A$ (Lipid & APM) time = 5.5 hrs. | $\eta_A$ (Lipid & APM) time = 21 hrs. | $\eta_A$ (Lipid & APM) time = 48 hrs. | $\eta_A$ (Lipid & APM) time = 96 hrs. |
|---|---|---|---|---|---|---|
| 22 | Wesson Oil TM (mainly triglycerides) | 200,000 | 700,000 | 1,200,000 | 920,000 | 840,000 |
| 23 | Durlo TM (a mixture of mono, di and triglycerides) | 600,000 | 2,500,000 | 2,400,000 | 1,800,000 | 740,000 |
| 24 | Atmos TM (a mixture of mono and diglycerides) | 250,000 | 90,000 | 52,000 | 78,000 | 78,000 |
| 25 | Myverol TM (mainly monoglycerides) | 400,000 | 115,000 | 160,000 | 66,000 | 80,000 |

*all viscosities are in centipoise

|  | % Aspartame Remaining | |
|---|---|---|
| Time (in days) | Example 20 | Example 21 |
| 0 | 100 | 100 |
| 2 | 94.7 | 93.5 |
| 5 | 85.2 | 83.2 |
| 9 | 78.5 | 75.8 |
| 13 | 72.7 | 68.3 |
| 22 | 57.3 | 52.5 |

Thus, analytically, the gel significantly stabilized the aspartame in the model beverage system. Examples 20 and 21 were both stored at 43° C. and a duplicate of Example 21 was stored at 7° C. These samples, both temperature Example 21 samples and the Example 20 sample, were brought to 4° C. and evaluated for sweetness by a trained taste panel. The trained panel reported the following relative sweetness levels, at the following times, for each sample.

| Time (in days) | 7° C. Example 21 | 43° C. Example 20 | 43° C. Example 21 |
|---|---|---|---|
| 8 | 5 | 5 | 4 |
| 16 | 5 | 5 | 4 |
| 24 | 5 | 4 | 4 |
| 32 | 5 | 3.5 | 4 |
| 40 | 5 | 1 | 1 |

Figure 2:
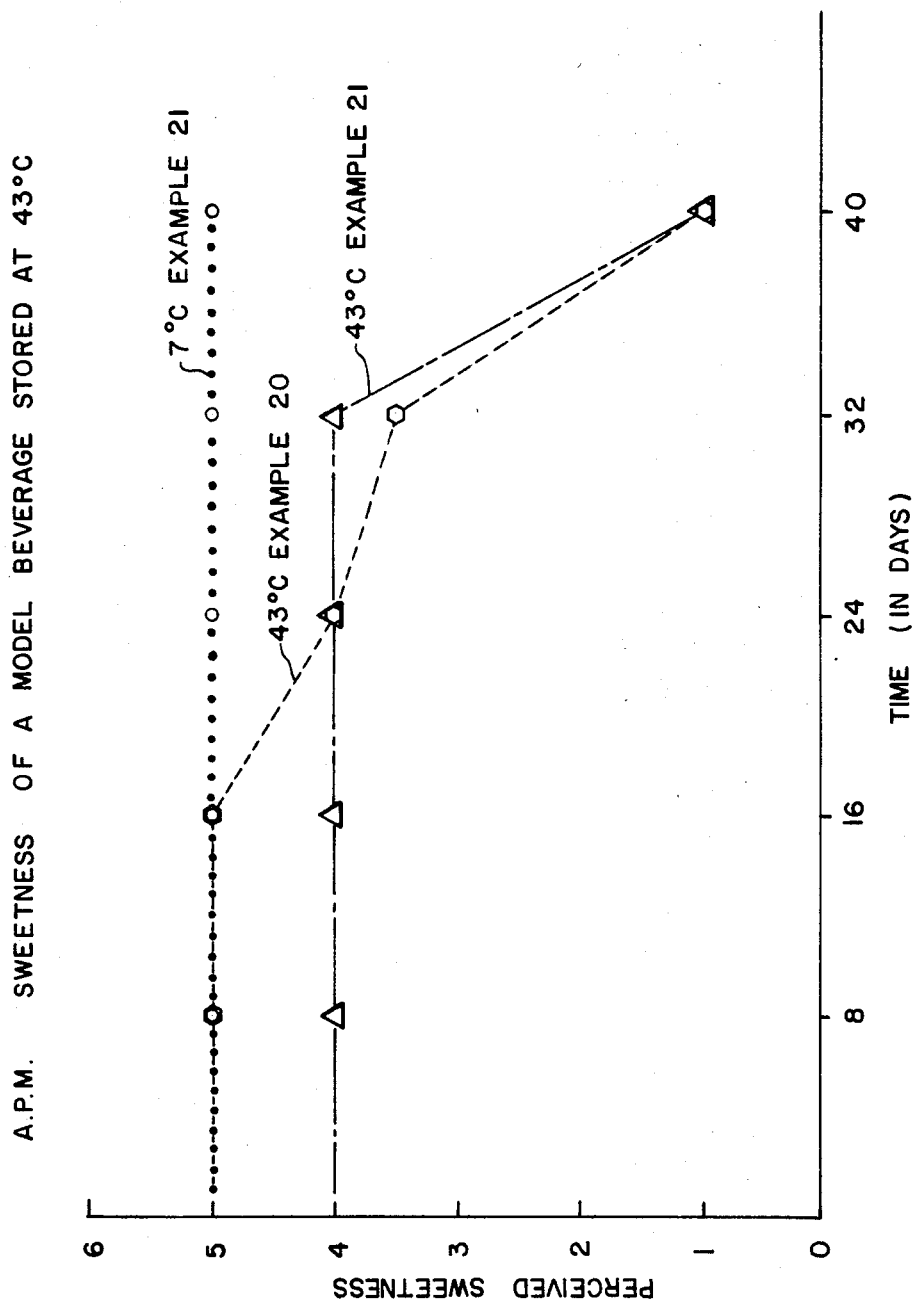
FIG. 2 shows the effect of storing a model pH 3 beverage system at 43° C. on the perceived sweetness of a beverage containing the gel of the present invention.

These results are plotted in FIG. 2.

EXAMPLES 22-25

In Examples 22-25, 1 part of aspartame with 4% moisture was combined with 9 parts of a lipid component at 77° C. The lipid component in each example was varied as specified in the table below. The combination was mixed well for 30 seconds while the temperature was maintained at 77° C. Additionally, the viscosity of the combination was measured at various times and is also reported in the table below. Furthermore, several Example 22, the Wesson TM Oil sample, was sweet at all times, but after 21 hours, the sample was slightly less sweet then the sample originally had been. (Wesson Oil TM is comprised substantially of—at least 90% is—triglycerides).

Example 23, the Durlo TM sample, was not sweet when tested after 1 hour. However, after 3 hours, the Durlo TM sample was slightly sweet.

Example 24, the Atmos TM sample, was not sweet after 10 minutes, but was sweet after 3 hours. Similarly, Example 25, the Myverol TM sample, was not sweet after 10 minutes, but was sweet after 2 hours.

It was also observed that the gel comprising Wesson Oil TM, Example 22, was thixotropic: when the gel was subjected to considerable shear forces, the viscosity of the Example 22 gel decreased considerably. However, when the Example 22 gel was allowed to sit, it recovered its original viscosity.

On the other hand, the viscosity of Examples 23 and 25 did not substantially decrease when subjected to shear forces.

During the first 3 hours, the viscosity of the Example 24 gel did not decrease when the gel was subjected to shear forces. However, after 8 days, the viscosity of the Example 24 gel dropped from $1.6 \times 10^6$ cps to $8 \times 10^4$ cps when the gel was subjected to shear forces, and upon sitting, the Example 24 gel did not recover its initial viscosity.

EXAMPLE 26

A lemon oil sample, 87 parts, was combined with 13 parts of 4% moisture aspartame at 10° C. The combination was well mixed and then heated to 100° C. until a solid-like substance was formed. When the mixture was cooled to ambient temperature, the resulting gel had an intense lemon character and was very sweet.

EXAMPLE 27

A dipeptide sweetened gum is made by the following procedure:

(a) soften 27 parts of a gum base by heating to 60° C.;
(b) add 13 parts of sorbitol and 4 parts of mannitol to the gum base in a mixer, blend the admixture while controlling the termperature to between 55° C. and 70° C.;
(c) add 1 part lecithin, 13 parts of sorbitol, and 4 parts of mannitol and blend;
(d) add 1 part of dipeptide sweetener-lipid gel comprising 0.5 parts aspartame, 0.5 parts Wesson Oil TM and 0.02 parts water and blend; and
(e) add 17 parts of sorbo syrup, 1 part flavor, 13 parts sorbitol, and 4 parts mannitol and blend.

The above Examples are given only for the purpose of illustrating the invention. All parts and percentages are by weight.

What is claimed is:

1. A dipeptide sweetener-lipid gel composition consisting essentially of, by weight;
   (a) one part hydrated, crystalline, dipeptide sweetener containing water of crystallization, wherein said hydrated dipeptide sweetener comprises between about 0.02 and about 1.0 parts water per part dipeptide sweetener; and
   (b) about 1 to about 100 parts lipid per part dipeptide sweetener wherein said lipid is selected from the group consisting of aliphatic acids, aliphatic acid esters and combinations thereof and said dipeptide sweetener-lipid composition is effective to form a gel which is thermally irreversible.

2. A gel according to claim 1 wherein said gel comprises between about 3 and about 30 parts lipid per part dipeptide sweetener.

3. A gel according to claim 1 wherein said gel comprises between about 5 and about 20 parts lipid per part dipeptide sweetener.

4. A gel according to claim 1 wherein said gel has a viscosity in excess of 200 cps at 100° C. under low shear conditions.

5. A gel according to claim 1 wherein said gel has a viscosity in excess of 1,000 cps at 100° C. under low shear conditions.

6. A gel according to claim 1 wherein said gel has a viscosity in excess of 10,000 cps at 100° C. under low shear conditions.

7. A gel according to claim 1 wherein said aliphatic acids and aliphatic acid residues are composed essentially of saturated, unsaturated and polyunsaturated acids and acid residues containing between about 10 and about 30 carbon atoms, and combinations thereof.

8. A gel according to claim 1 wherein at least about 10% of said lipid is comprised of triglycerides.

9. A gel according to claim 8 wherein said triglyceride has a melting point less than about 50° C.

10. A gel according to claim 8 wherein said triglyceride has a melting point of at least about −16° C.

11. A gel according to claim 1 wherein at least about 92% of said lipid is comprised of triglycerides.

12. A gel according to claim 1 wherein at least about 10% of said lipid comprised aliphatic acid monoesters, aliphatic acid diesters, and combinations thereof.

13. A gel according to claim 12 wherein less than about 40% of said lipid is comprised of triglycerides.

14. A gel according to claim 12 wherein substantially all of the lipid is composed essentially of aliphatic acid monoesters, aliphatic acid diesters and combinations thereof.

15. A gel according to claim 1 wherein some of the water hydrating the dipeptide sweetener is surface absorbed water.

16. A gel according to claim 1 wherein said dipeptide sweetener is aspartame.

17. A gel according to claim 16 wherein some of the water in hydrating the dipeptide sweetener is surface absorbed water.

18. A process for producing a thermally sible, aspartamelipid gel comprising the steps of:
   (a) combining ingredients consisting essentially of 1 part hydrated, crystalline aspartame containing water of crystallization, wherein said aspartame sweetener comprises between about 0.02 and about 1 part water per part aspartame, with between about 1 and about 100 parts lipid; and
   (b) heating the aspartame-lipid admixture to a temperature between about 25° C. and the temperature at which the lipid decomposes for a time effective to produce a viscosity increase of at least about 100%.

19. A process according to claim 18 wherein said heated admixture is maintained at least about 5° C. below the lipid decomposition temperature.

20. A process according to claim 18 wherein said aspartamelipid admixture is heated to at least about 50° C.

21. A process according to claim 18 wherein said aspartamelipid admixture is heated for a time effective to produce a viscosity increase of between about 1.0 and about 10 fold.

22. A process according to claim 18 wherein said aspartamelipid admixture is heated for a time effective to product a viscosity increase of at least about 1,000%.

23. A process according to claim 19 wherein said aspartamelipid admixture is heated for at least 10 seconds.

24. A process according to claim 18 wherein said aspartamelipid admixture is heated for at least 30 seconds.

25. A process according to claim 18 wherein said aspartamelipid is heated for at least about 5 minutes.

26. A process according to claim 18 wherein said aspartamelipid admixture is heated for less than about 72 hours.

27. A process according to claim 18 wherein said aspartame is water absorbed on the sweetener's surface.

28. A process according to claim 18 wherein the lipid is composed essentially of aliphatic acid esters.

29. A process according to claim 27 wherein said esters are glycerol esters.

30. A process according to claim 18 wherein the dipeptide sweetener is aspartame.

31. A process according to claim 18 wherein at least some of the water hydrating the aspartame is water absorbed on the surface of the aspartame.

* * * * *